Sept. 9, 1924.  
A. M. FENTON ET AL  
1,508,094  
PRODUCTION OF FRICTION DISKS, WASHERS, BRAKE LININGS, AND THE LIKE  
Original Filed Dec. 9, 1921

INVENTORS:
Alexander Miller Fenton.
Thomas Henry Crowther.
per G.F.M.Hardingham.
Attorney.

Patented Sept. 9, 1924.

1,508,094

UNITED STATES PATENT OFFICE.

ALEXANDER MILLER FENTON AND THOMAS HENRY CROWTHER, OF CLECKHEATON, ENGLAND, ASSIGNORS TO SCANDINAVIA BELTING, LIMITED, OF LONDON, ENGLAND.

PRODUCTION OF FRICTION DISKS, WASHERS, BRAKE LININGS, AND THE LIKE.

Original application filed December 9, 1921, Serial No. 521,243. Divided and this application filed May 9, 1923. Serial No. 637,888.

*To all whom it may concern:*

Be it known that we, ALEXANDER MILLER FENTON, a subject of the King of Great Britain and Ireland, residing at Northcliffe, Cleckheaton, in the county of York, England, and THOMAS HENRY CROWTHER, a subject of the King of Great Britain and Ireland, residing at Prospect Villas, Cleckheaton, aforesaid, have invented new and useful Improvements in and in the Production of Friction Disks, Washers, Brake Linings, and the like, of which the following is a specification.

This invention is the subject of a division of our application, filed on the 9th December, 1921, Serial Number 521,243, and relates to improvements in, and in the production of, segmental linings for use as friction surfaces in brake-shoes, brake-straps and the like, and in particular to the types of such elements as are used in automobile vehicles; our objects being to enhance the efficiency thereof, to simplify their manufacture, to economize material and to facilitate their impregnation with a binding and hardening agent.

We are aware that it had been proposed to make a curved brake or clutch lining whereof the body is composed of a felted fibrous material arranged in superposed layers; but according to our improved method of manufacture, the mass whence the linings are produced is built up by forming, upon a bobbin, a winding of yarn, tape or canvas composed of cotton, ramie, flax, silk, wool, asbestos or other suitable fibrous material, or any combination of such materials, impregnated with a suitable binding agent and, after drying and after heating the mass for the purpose of hardening it, cutting it into rings of the required width and ultimately dividing the rings into segments of the required lengths.

The employment of a winding of fibrous material in the form of yarn or woven into a textile such as canvas, as above described, results in a product which has considerably greater strength in a circumferential direction than when the body is composed of a felted material.

Figure 1:
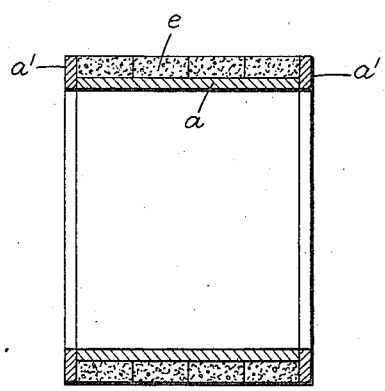
Figure 2:
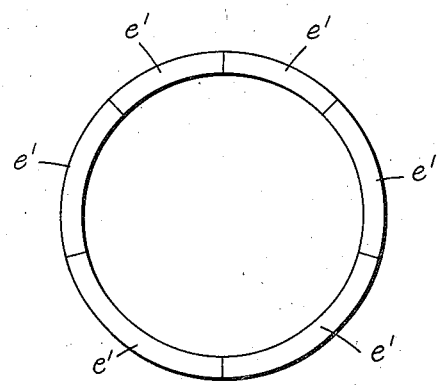

Appliances adapted for use in carrying our invention into effect are illustrated in Fig. 1 of the accompanying drawings, whilst Fig. 2 is a face view of a ring formed with the aid thereof and cut into segments.

Yarn, tape or canvas, impregnated with a viscous product such as that obtained by boiling phenol and formaldehyde in the presence of a catalytic agent by passing the material through a bath thereof, is wound upon the drum $a$ furnished with retaining plates $a^1$ temporarily held in position. The wound mass $e$ is then dried, hardened by heating, and cut into rings of the required width. The rings so formed may then be removed from the drum and cut into segments $e^1$ of the required length for use as friction linings in brake-shoes, brake-straps and the like.

We claim:—

1. The manufacture of segmental linings for use as friction surfaces in brake-shoes, brake-straps and the like, by forming, upon a bobbin or drum furnished with co-axial retaining plates, a winding of fibrous material composed of yarn, impregnated with a suitable binding agent, drying and hardening the wound mass, cutting the same into rings of the required width and the latter into segments of the required length.

2. Segmental linings for use as friction surfaces in brake-shoes, brake-straps and the like, consisting of a winding of fibrous material composed of yarn, impregnated with a suitable binding and hardening agent, such wound mass being cut into rings of the required width and the latter into segments of the required length.

ALEXANDER MILLER FENTON.
THOMAS HENRY CROWTHER.